(12) United States Patent
Takemura

(10) Patent No.: US 9,128,328 B2
(45) Date of Patent: Sep. 8, 2015

(54) LIQUID CRYSTAL DEVICE AND PROJECTOR

(71) Applicant: Seiko Epson Corporation, Tokyo (JP)

(72) Inventor: Koichi Takemura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 14/028,624

(22) Filed: Sep. 17, 2013

(65) Prior Publication Data

US 2014/0078411 A1 Mar. 20, 2014

(30) Foreign Application Priority Data

Sep. 19, 2012 (JP) .................................. 2012-205348

(51) Int. Cl.
*G02F 1/1337* (2006.01)
(52) U.S. Cl.
CPC ........ *G02F 1/1337* (2013.01); *G02F 1/133734* (2013.01); *G02F 2001/133776* (2013.01)
(58) Field of Classification Search
CPC ........................ G02F 1/133734; G02F 1/1337
USPC ........................................................ 349/123
See application file for complete search history.

(56) References Cited

U.S. PATENT DOCUMENTS

| | | | |
|---|---|---|---|
| 5,477,360 | A | 12/1995 | Sunohara et al. |
| 5,596,435 | A | 1/1997 | Sunohara et al. |
| 6,320,635 | B1 | 11/2001 | Matsui |
| 2005/0052600 | A1 | 3/2005 | Hashimoto et al. |
| 2007/0273812 | A1 | 11/2007 | Bone et al. |
| 2010/0006538 | A1 | 1/2010 | Asuke |

FOREIGN PATENT DOCUMENTS

| | | |
|---|---|---|
| JP | 02-039024 A | 2/1990 |
| JP | 03-259116 A | 11/1991 |
| JP | 07-028067 A | 1/1995 |
| JP | 08-106094 A | 4/1996 |
| JP | 11-223813 A | 8/1999 |
| JP | 2004-264658 A | 9/2004 |
| JP | 2005-077901 A | 3/2005 |
| JP | 2006-079118 A | 3/2006 |
| JP | 2007-79208 A | 3/2007 |
| JP | 2007-127757 A | 5/2007 |
| JP | 2010-020093 A | 1/2010 |
| JP | 2011-209390 A | 10/2011 |
| JP | 2012-208425 A | 10/2012 |

*Primary Examiner* — Phu Vu
(74) *Attorney, Agent, or Firm* — ALG Intellectual Property, LLC

(57) ABSTRACT

A liquid crystal device includes a substrate, a base body that is disposed opposing the substrate, a liquid crystal layer that is held between the substrate and the base body, an inorganic alignment film that is provided between the liquid crystal layer and the substrate or the base body, and a protection film that is provided between the inorganic alignment film and the liquid crystal layer, the inorganic alignment film has a plurality of grooves that are hollowed toward the surface on the opposite side of the liquid crystal layer from the surface on the liquid crystal layer side, and the protection film has a cave-in shape toward the opposite side to the liquid crystal layer from the liquid crystal layer side in at least one portion of portions corresponding to the plurality of grooves.

9 Claims, 4 Drawing Sheets

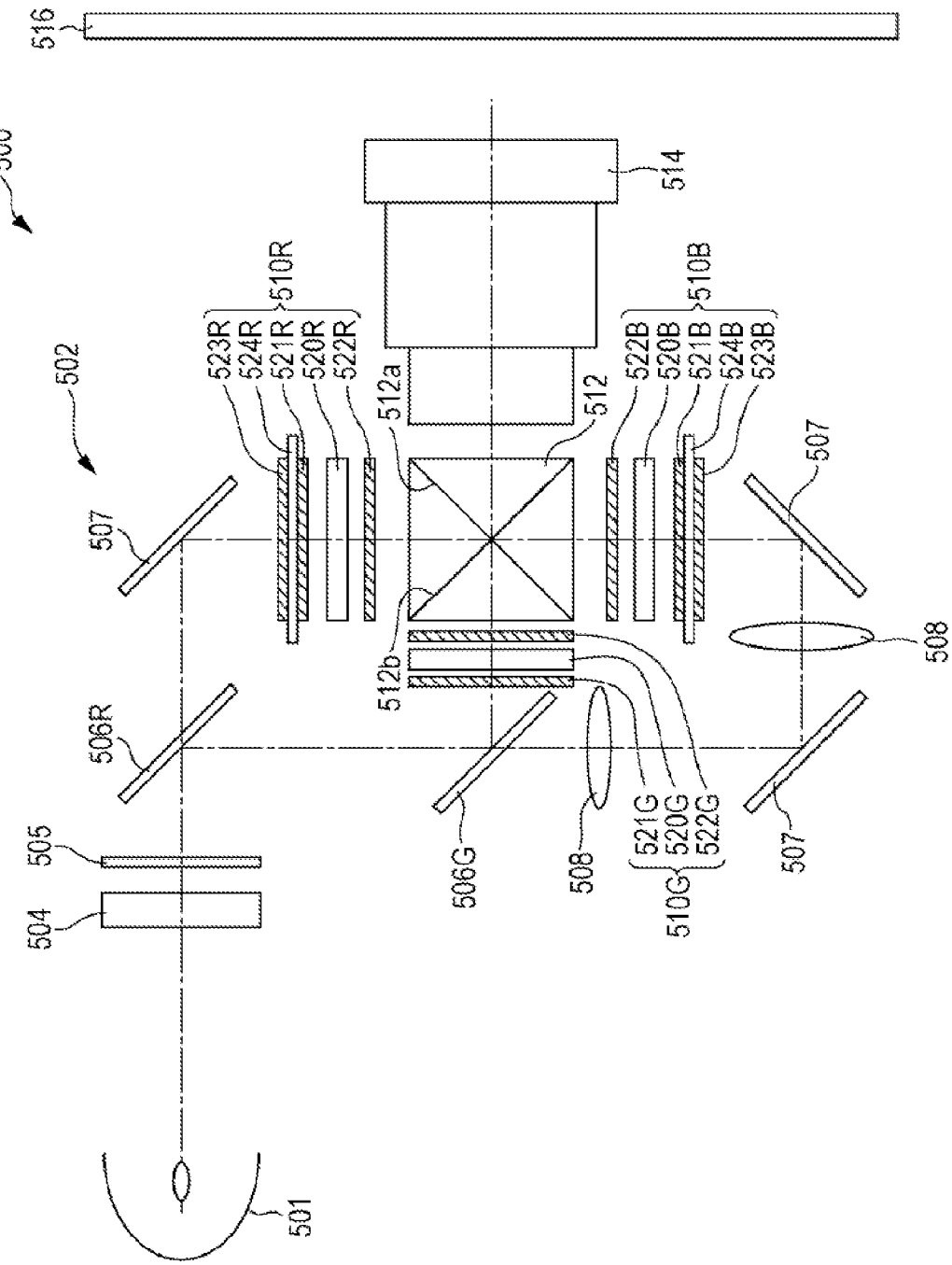

LIQUID CRYSTAL DEVICE AND PROJECTOR

BACKGROUND

1. Technical Field

The present invention relates to a liquid crystal device and a projector.

2. Related Art

A liquid crystal device which has a liquid crystal layer held by two substrates and an alignment film for controlling alignment of the liquid crystal layer on the inner surface sides of the substrates is known. As an alignment film provided in such a liquid crystal device, an oblique vapor deposition film that is an inorganic film has been employed in consideration of a light resistance property thereof in recent years. As displays come to have high brightness and their expanding application to digital signage, further enhancement of the life of the light resistance property has been required recently.

As one main cause of shortening the life of the light resistance property of the inorganic alignment film, influence of optical reaction of the interface between liquid crystal and an alignment film (reaction of photoactive groups present in the interface) is considered. Since an oblique vapor deposition film has a porous structure, there are an enormous number of interfaces between the film and the liquid crystal. For this reason, in order to suppress optical deterioration reaction of the oblique vapor deposition film, it is found that reducing the ratios of the interfaces and photoactive groups is useful. For example, JP-A-2007-79208 discloses a structure in which the top of an oblique vapor deposition film is covered by an organic film.

However, in such a structure in which the surface of the alignment film is merely covered as described in JP-A-2007-79208, it is difficult to control the alignment of the liquid crystal layer. In addition, since the organic film is easily decomposed by light, the light resistance property is difficult to improve.

SUMMARY

An advantage of some aspects of the invention is to provide a liquid crystal device, a manufacturing method of the liquid crystal device which has a capability of controlling alignment of a liquid crystal layer and an excellent light resistance property, and a projector.

According to a first aspect of the invention, there is provided a liquid crystal device which includes a substrate, a base body that is disposed opposing the substrate, a liquid crystal layer that is held between the substrate and the base body, an inorganic alignment film that is provided between the liquid crystal layer and the substrate or the base body, and a protection film that is provided between the inorganic alignment film and the liquid crystal layer, the inorganic alignment film has a plurality of grooves that are hollowed toward the surface on the opposite side of the liquid crystal layer from the surface on the liquid crystal layer side, and the protection film has a cave-in shape toward the opposite side to the liquid crystal layer from the liquid crystal layer side in at least one portion of portions corresponding to the plurality of grooves.

According to the aspect of the invention, since the protection film is provided between the inorganic alignment film and the liquid crystal layer, the number of photoactive groups in an alignment layer on the interface between the liquid crystal layer can be drastically reduced. Accordingly, occurrence of optical reaction can be lowered, and thus improvement in a light resistance property can be attained. In addition, since the inorganic alignment film has the plurality of grooves which are hollowed toward the surface on the opposite side of the liquid crystal layer from the surface on the liquid crystal layer side, and the protection film has a cave-in shape toward the opposite side to the liquid crystal layer from the liquid crystal layer side in at least one portion of the portions corresponding to the plurality of grooves, an alignment control property of the liquid crystal layer can be secured. Accordingly, the liquid crystal device which has an excellent light resistance property while having the alignment control property of the liquid crystal layer can be provided.

In the liquid crystal device, the inorganic alignment film may include a plurality of columns that are inclined to the normal line direction of a surface of the substrate or the base body, and, in the inclination, when an inclination direction as viewed from the top in the normal line direction of the surface of the substrate or the base body is set to be a first direction, the plurality of grooves may be formed in a second direction intersecting with the first direction.

According to the aspect, since the inorganic alignment film has the plurality of columns that are inclined to the normal line direction of the surface of the substrate or the base body, and, in the inclination, when an inclination direction as viewed from the top in the normal line direction of the surface of the substrate or the base body is set to be the first direction, the plurality of grooves are formed in the second direction intersecting with the first direction, the alignment of the liquid crystal layer can be controlled in the grooves formed in the direction intersecting with the direction in which the columns are inclined.

In the liquid crystal device, the plurality of grooves may be hollows which are inclined in the same direction as the inclination direction of the plurality of columns with respect to the normal line direction of the substrate or the base body.

According to the aspect of the invention, since the plurality of grooves are hollows which are inclined in the same direction as the inclination direction of the plurality of columns with respect to the normal line direction of the substrate or the base body, the grooves can be inclined so as to correspond to the inclination of the columns. Accordingly, the alignment control property of the liquid crystal layer can be enhanced.

In the liquid crystal device, the protection film may get into the plurality of grooves and thereby reduce the depths of the hollows.

According to the aspect of the invention, since the protection film gets into the plurality of grooves and thereby reduces the depths of the hollows, the surface area of the interface with the liquid crystal layer can be reduced. Accordingly, optical reaction on the interface between the liquid crystal and an alignment film can be suppressed.

In the liquid crystal device, there may be spaces inside the plurality of the columns and the protection film may be formed so as to fill the spaces.

According to the invention, since there are voids inside the plurality of columns and the protection film is formed so as to fill the voids, liquid crystal does not intrude the voids, and optical reaction on the interface between the intruding liquid crystal and an alignment film can be suppressed. It is preferable to completely fill the voids, however, if at least some of the voids are formed to be filled, when liquid crystal intrudes the voids, the surface area of the interface with the liquid crystal can be reduced. Accordingly, optical reaction on the interface between liquid crystal and the alignment film can be suppressed.

In the liquid crystal device, a step portion may be further included on the surface of the substrate or the base body on the liquid crystal layer side, and the plurality of grooves may be formed in a portion corresponding to the step portion.

According to the aspect of the invention, since a step portion is further included on the surface of the substrate or the base body on the liquid crystal layer side, and the plurality of grooves are formed in a portion corresponding to the step portion, the grooves can be formed using the shape of the step portion. Accordingly, a process of manufacturing the grooves can be simplified.

In the liquid crystal device, an electrode may be further formed on the surface of the substrate or the base body on the liquid crystal layer side, and the step portion may be formed on the surface of the electrode on the liquid crystal layer side.

According to the aspect of the invention, since an electrode is formed on the surface of the substrate or the base body on the liquid crystal layer side, and the step portion is formed on the surface of the electrode on the liquid crystal layer side, the grooves can be configured to be more surely included.

In the liquid crystal device, the protection film may be formed using a material including any of a polysiloxane-based vertical alignment material, silicon oxide, silicon nitride, or aluminum oxide.

According to the aspect of the invention, since the protection film is formed using a material including any of a polysiloxane-based vertical alignment material, silicon oxide, silicon nitride, and aluminum oxide, the liquid crystal device having a high light resistance property is obtained.

In the liquid crystal device, the protection film may be formed using a liquid phase film forming method.

According to the aspect of the invention, since the protection film is formed using a liquid phase film forming method, the protection film can be applied with efficiency and high accuracy.

In the liquid crystal device, the inorganic alignment film may be formed using an oblique vapor deposition method.

According to the aspect of the invention, since the inorganic alignment film is formed using an oblique vapor deposition method, the inorganic alignment film can be formed with efficiency and high accuracy.

According to still another aspect of the present invention, there is a projector which includes the liquid crystal device described above.

According to the aspect of the invention, since the liquid crystal device which has the excellent light resistance property while having the alignment control property of the liquid crystal layer is included, the projector which is highly reliable in terms of a display characteristic and the life can be provided.

BRIEF DESCRIPTION OF THE DRAWINGS

The invention will be described with reference to the accompanying drawings, wherein like numbers reference like elements.

FIG. 7 is a schematic diagram showing an optical system of a projector according to an embodiment of the invention.

DESCRIPTION OF EXEMPLARY EMBODIMENTS

Hereinafter, embodiments of the present invention will be described with reference to the drawings.

Figure 1:
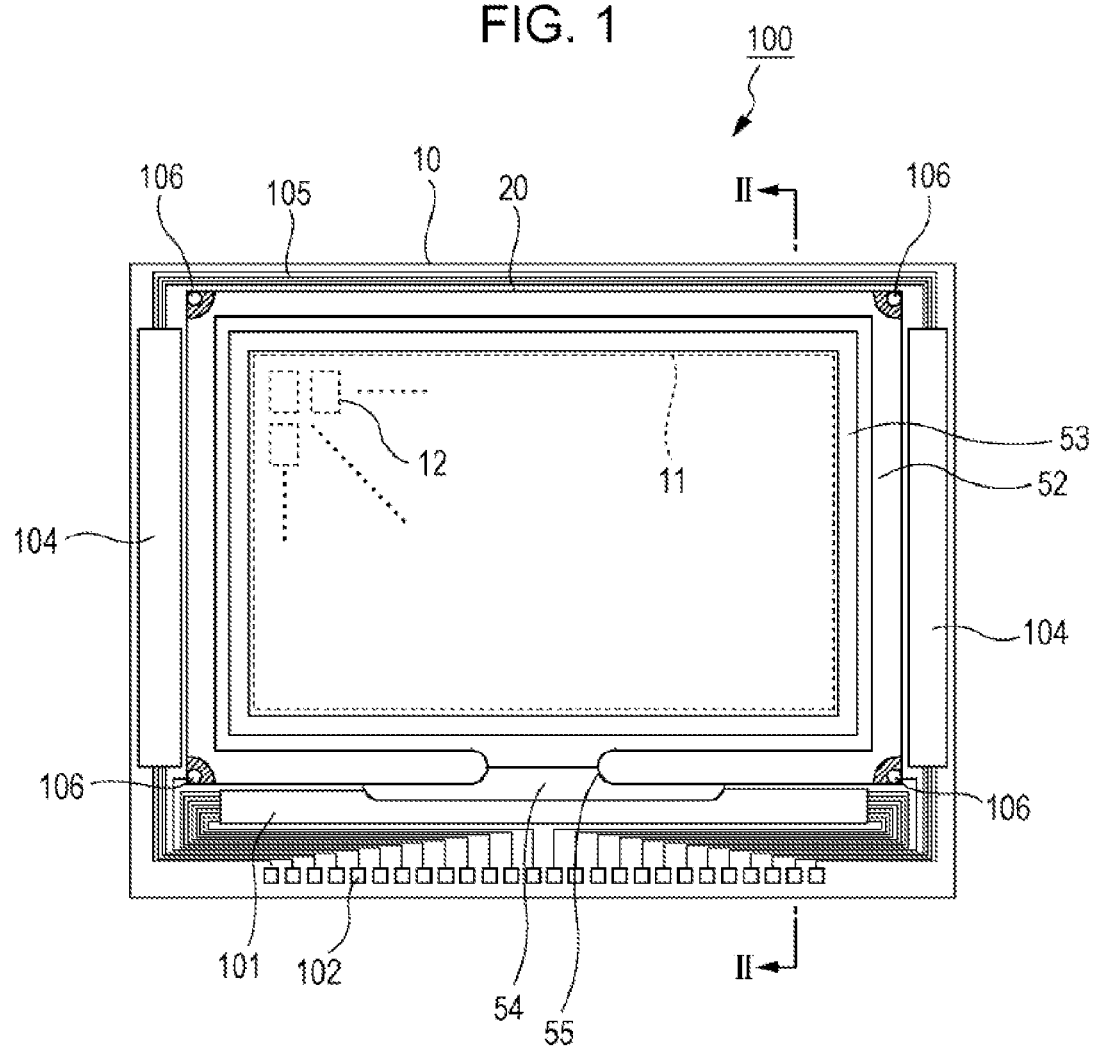
FIG. 1 is a plan view showing an outlined configuration of a liquid crystal device.
Figure 2:
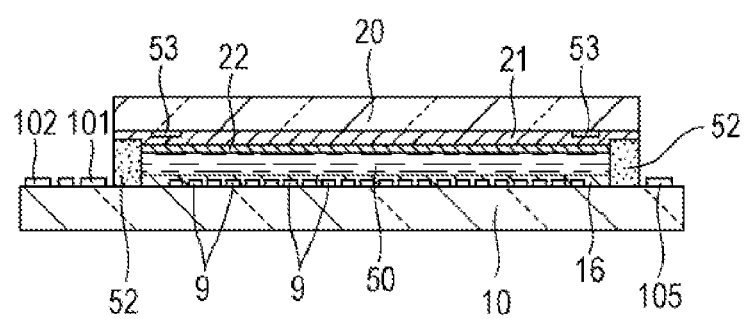
FIG. 2 is a cross-sectional view showing a configuration cut along the line II-II of FIG. 1.

FIG. 1 is an example of a plan view showing an outlined configuration of a liquid crystal device 100. FIG. 2 is an example of a cross-sectional view showing a configuration cut along the line II-II of FIG. 1. Note that the present embodiment exemplifies a liquid crystal device of a vertical alignment (VA) mode as an example of a liquid crystal device.

The liquid crystal device 100 has an element substrate 10 and a counter substrate 20 (a pair of substrates). The element substrate 10 bonds to the counter substrate 20 via a sealing material 52 having a substantial rectangular shape as viewed from the top. In the sealing material 52, an opening portion 55 (injection portion) into which liquid crystal is injected is formed, and the opening portion 55 is sealed by a sealing member 54. Within the region surrounded by the sealing material 52 and the sealing member 54, a liquid crystal layer 50 is enclosed. A frame 53 which has a rectangular shape as viewed from the top is formed along the inner circumference of the sealing material 52 and the sealing member 54, and the inner region of the frame 53 forms a display region 11.

On the inner side of the display region 11, a plurality of pixels 12 are provided in a matrix shape. Each of the pixels 12 constitutes a minimum display unit of the display region 11. Along one side (the bottom side of the drawing) of the element substrate 10 in an outer region of the sealing material 52, a data line drive circuit 101 and an external circuit installation terminals 102 are formed, and scanning line drive circuits 104 are respectively formed along the two sides adjacent to the one side, constituting peripheral circuits.

On the remaining one side (the top side shown in the drawing) of the element substrate 10, a plurality of wirings 105 connecting the scanning line drive circuits 104 on both sides of the display region 11 are provided. In addition, in corners of the counter substrate 20, inter-substrate conductive materials 106 for having electric conduction between the element substrate 10 and the counter substrate 20 are disposed.

On the liquid crystal layer 50 side of the element substrate 10, an arrangement of a plurality of pixel electrodes 9 is formed. The pixel electrodes 9 are provided for each of the pixels 12. A plurality of switching elements (omitted in the drawing) are provided on the element substrate 10. The switching elements are configured by, for example, thin-film transistors and provided for each of the pixels 12. Source regions of the switching elements are electrically connected to the data line drive circuit 101 via data lines which are omitted in the drawing. Gate electrodes of the switching elements are electrically connected to the scanning line drive circuits 104 via scanning lines which are omitted in the drawing. Drain regions of the switching elements are electrically connected to the pixel electrodes 9.

A first alignment layer 16 is formed on the pixel electrodes 9. On the liquid crystal layer 50 side of the counter substrate 20, the frame 53 and a light blocking film (omitted in the drawing) are formed. A common electrode 21 which covers the entire surface of the display region 11 is formed on the frame 53 and the light blocking film (omitted in the drawing). A second alignment layer 22 is formed on the common electrode 21. An alignment state of the liquid crystal layer 50 to which an electric field has not been applied is controlled by the first alignment layer 16 and the second alignment layer 22.

The liquid crystal device 100 is configured as a transmissive-type liquid crystal device. The pixel electrodes 9 and the common electrode 21 are configured as transparent electrodes using a conductive material having a high light transmittance such as indium-tin oxide (hereinafter, referred to as ITO).

Image signals of an image to be displayed are supplied from the outside of the liquid crystal device 100 via the external circuit installation terminals 102. The data line drive circuit 101 outputs drive voltage waveforms for driving the liquid crystal layer 50 to the switching elements based on image data which is included in the image signals indicating grayscale values of each pixel. The scanning line drive circuits 104 apply a voltage to the gate electrodes of the switching elements based on data which is included in the image signals indicating a display timing of pixels to control turning-on or turning-off of the switching elements.

When the switching elements are turned on, the drive voltage waveforms are supplied to the pixel electrodes 9, and thereby a voltage is applied to the pixel electrodes 9. An electric potential of the common electrode 21 is maintained as, for example, a common potential which is common for the plurality of pixels 12. A voltage corresponding to the difference between electric potentials of the pixel electrodes 9 and the common electrode 21 is applied to the liquid crystal layer 50. According to the electric field generated from the voltage, the alignment state of the liquid crystal layer 50 is changed. A polarization state of light incident on the liquid crystal layer 50 changes for each of the pixels 12 according to the alignment state of the liquid crystal layer 50. By causing light emitted from the liquid crystal layer 50 to pass through a polarization plate (omitted in the drawing), light having a grayscale value according to the image data is emitted from the polarization plate. In this manner, an image corresponding to the image data can be displayed.

Figure 3:
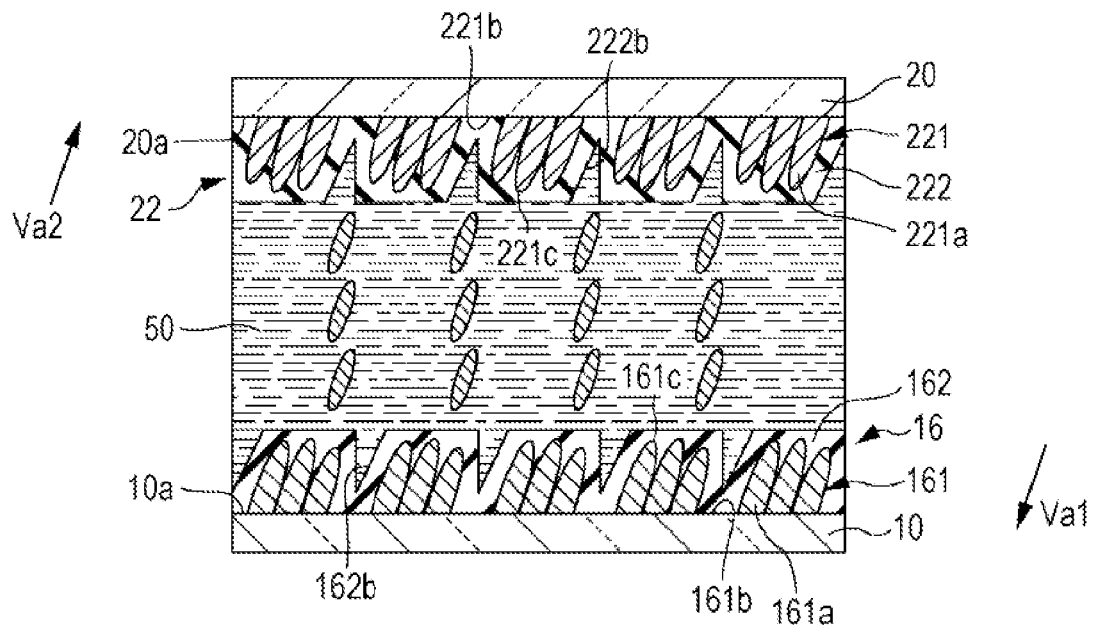
FIG. 3 is a cross-sectional view showing configurations of a first alignment layer and a second alignment layer.
Figure 4:
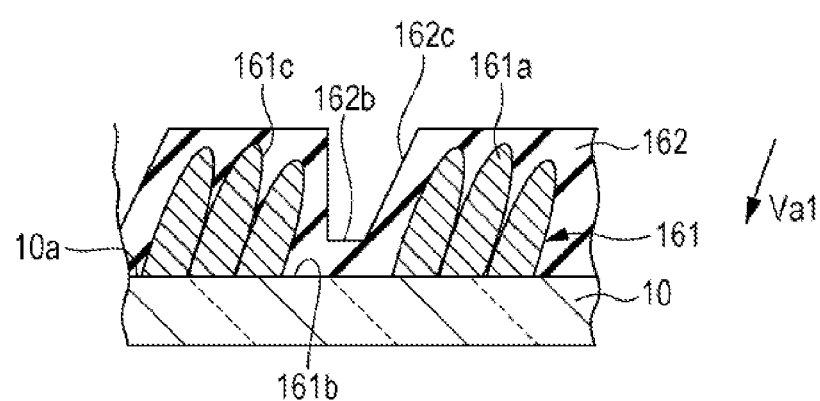
FIG. 4 is a diagram showing an enlarged cross-sectional view of the first alignment layer.

FIG. 3 is an example of a cross-sectional view showing configurations of the first alignment layer 16 and the second alignment layer 22. FIG. 4 is a diagram showing an enlarged cross-section of the first alignment layer 16. For the sake of easy understanding of the drawings, the pixel electrodes 9, the common electrode 21, and various wirings and various drive circuits are not illustrated in FIGS. 3 and 4.

As shown in FIG. 3, the first alignment layer 16 is formed on a counter surface 10a of the element substrate 10 opposing the counter substrate 20. The second alignment layer 22 is formed on another counter face 20a of the counter substrate 20 opposing the element substrate 10. The liquid crystal layer 50 is disposed so as to come into contact with the first alignment layer 16 and the second alignment layer 22.

The first alignment layer 16 has an inorganic alignment film 161 disposed on the element substrate 10 and a protection film 162 disposed so as to be stacked on the inorganic alignment film 161. The inorganic alignment film 161 has a plurality of crystalline bodies 161a in a column shape (columns) formed of, for example, silicon oxide or metal oxide. The crystal growth direction of the columns 161a is a direction oblique with respect to the normal line of the substrate.

The inorganic alignment film 161 has grooves 161b. The grooves 161b are formed between the columns 161a. For example, on the counter surface 10a of the element substrate 10, regions in which a number of columns 161a are densely arranged and regions in which the columns 161a are sparsely arranged are formed. In such a case, the regions in which the columns 161a are sparsely arranged are formed as the grooves 161b. FIGS. 3 and 4 show that the surface of the element substrate 10 or of the counter substrate 20 is set to be exposed in the grooves 161b for the sake of easy understanding of the drawings, however, the formation is not limited thereto. For example, the grooves 161b may be configured to be formed in a part of the columns 161a in the depth direction.

In addition, the protection film 162 is formed using an inorganic insulating material. In the present embodiment, the protection film 162 is formed using, for example, a polysiloxane-based vertical alignment material such as organopolysiloxane. As such a vertical alignment material, for example, silicon oxide such as SiO or $SiO_2$, silicon nitride such as SiN, or the like is exemplified. Note that the protection film 162 is not limited to the polysiloxane-based vertical alignment material, and other inorganic insulating material such as Al oxide may be used.

The protection film 162 is provided so as to cover surfaces 161c on the liquid crystal layer 50 side including the columns 161a and the grooves 161b of the inorganic alignment film 161 as shown in FIG. 3 using a liquid phase film formation method, for example, an ink jet method, a spin coat method, or the like. On the surface of the inorganic alignment film 161, uneven portions generated from, for example, differences of the shapes of the plurality of columns 161a are formed, and the protection film 162 is formed so as to flatten at least a part of the uneven portions. Note that FIGS. 3 and 4 shows a configuration in which the protection film 162 is provided so as to cover the entire inorganic alignment film 161, however, the configuration is not limited thereto, and the protection film 162 may be configured to be provided so as to cover a part of the inorganic alignment film 161.

In addition, there are voids on the inner side of the plurality of columns 161a, and the protection film 162 is formed so as to fill the voids. For this reason, liquid crystal does not intrude into the void portions, and light reaction of the interface between intruding liquid crystal and the first alignment layer 16 can be suppressed. It is preferable that the voids be completely filled, however, if at least a part of the voids is formed to be filled, when liquid crystal intrudes into the voids, the surface area of the interface between the liquid crystal can be reduced. Accordingly, light reaction of the interface between the liquid crystal and the first alignment layer 16 is suppressed.

On the interface of the protection film 162 between the liquid crystal layer 50, concave portions 162b are formed. The concave portions 162b are provided in at least a part of regions of the inorganic alignment film 161 overlapping the grooves 161b. As the inorganic insulating material composing the protection film 162 gets into a part of the grooves 161b of the inorganic alignment film 161, the shape of the concave portions 162b has a shape similar to the shape of the grooves 161b.

The concave portions 162b are formed so as to have a dimension in the depth direction of about, for example, 15 nm to 150 nm. In addition, the concave portions 162b are formed so as to have a dimension in the inclination direction of the columns 161a (dimension in the width direction of the concave portions 162b) of about, for example, 15 nm to 100 nm.

The grooves 161b are formed, for example, so as to be inclined corresponding to the inclination of the columns 161a with respect to the normal line direction of the surface of the substrate as shown in FIG. 4. Meanwhile, the concave portions 162b formed in the positions overlapping the grooves 161b have faces 162c which are inclined corresponding to the inclination of the columns 161a.

Figure 5:
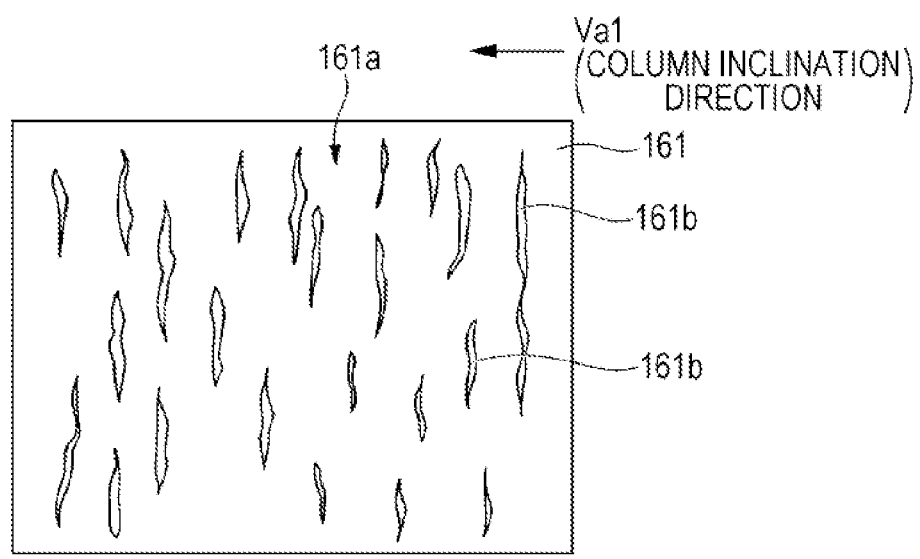
FIG. 5 is a diagram showing a plan configuration of an inorganic alignment film.

FIG. 5 is a diagram showing an example of a plan configuration of the inorganic alignment film 161.

As shown in FIG. 5, in the view of the substrate surface of the element substrate 10, the grooves 161b are formed, for example, over the entire counter surface 10a of the element substrate 10. The grooves 161b are formed in a shape extending in the direction intersecting to the direction in which the columns 161a are inclined. In addition, the grooves 161b are formed in a shape in which, for example, a part of the surface of the inorganic alignment film 161 appears to crack (crack shape).

Figure 6:
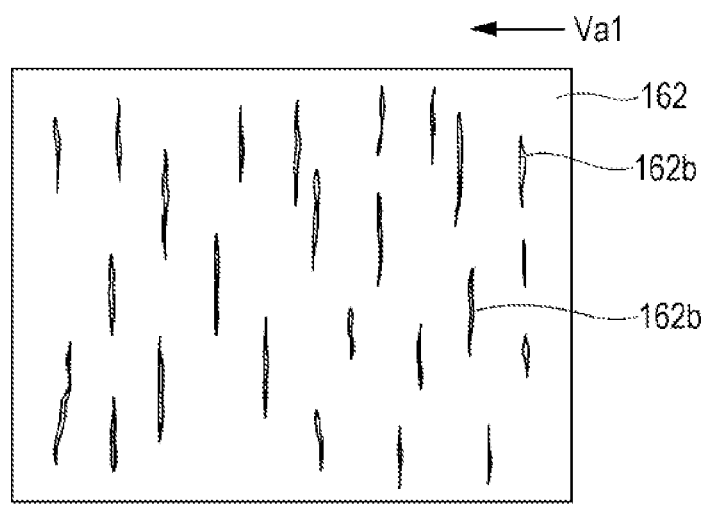
FIG. 6 is a diagram showing a plan configuration of a protection film.

FIG. 6 is a diagram showing an example of a plan configuration of the protection film 162.

As shown in FIG. 6, the concave portions 162b are formed in positions substantially overlapping the grooves 161b when viewed from the top. The concave portions 162b extend in a direction along the extending direction of the grooves 161b. The concave portions 162b are formed in a state in which, for example, parts of the surface of the protection film 162 are open, and the opening shapes are formed to be gentler than the grooves 161b.

On the other hand, the second alignment layer 22 has an inorganic alignment film 221 disposed on the counter substrate 20, and a protection film 222 disposed so as to be stacked on the inorganic alignment film 221. The inorganic alignment film 221 has a number of crystalline bodies 221a in a column shape (columns) formed of, for example, silicon oxide or metal oxide. The crystal growth direction of the columns 221a is a direction oblique with respect to the normal line of the substrate.

The inorganic alignment film 221 has grooves 221b. The grooves 221b are formed between the columns 221a. For example, on the counter surface 20a of the counter substrate 20, regions in which a number of columns 221a are densely arranged and regions in which the columns 221a are sparsely arranged are formed. In such a case, the regions in which the columns 221a are sparsely arranged are formed as the grooves 221b.

In addition, the protection film 222 is formed using an inorganic insulating material. In the present embodiment, the protection film 222 is formed using, for example, a polysiloxane-based vertical alignment material such as organopolysiloxane the same as the protection film 162. As such a vertical alignment material, for example, silicon oxide such as SiO or $SiO_2$, silicon nitride such as SiN, or the like is exemplified. Note that the protection film 222 is not limited to the polysiloxane-based vertical alignment material, and other inorganic insulating material such as Al oxide may be used.

The protection film 222 is provided so as to cover surfaces 221c on the liquid crystal layer 50 side including the columns 221a and the grooves 221b of the inorganic alignment film 221 as shown in FIG. 3 using a liquid phase film formation method, for example, an ink jet method, a spin coat method, or the like. On the surface of the inorganic alignment film 221, uneven portions generated from, for example, differences of the shapes of the plurality of columns 221a are formed, and the protection film 222 is formed so as to flatten at least a part of the uneven portions. Note that FIGS. 3 and 4 show a configuration in which the protection film 222 is provided so as to cover the entire inorganic alignment film 221, however, the configuration is not limited thereto, and the protection film 222 may be configured to be provided so as to cover a part of the inorganic alignment film 221.

In addition, there are voids on the inner side of the plurality of columns 221a, and the protection film 222 is formed so as to fill the voids. For this reason, liquid crystal does not intrude into the void portions, and light reaction of the interface between intruding liquid crystal and the second alignment layer 22 can be suppressed. It is preferable that the voids be completely filled, however, if at least a part of the voids is formed to be filled, when liquid crystal intrudes into the voids, the surface area of the interface between the liquid crystal can be reduced. Accordingly, light reaction of the interface between the liquid crystal and the second alignment layer 22 is suppressed.

On the interface of the protection film 222 between the liquid crystal layer 50, concave portions 222b are formed. The concave portions 222b are provided in at least a part of regions of the inorganic alignment film 221 overlapping the grooves 221b. As the inorganic insulating material composing the protection film 222 gets into a part of the grooves 221b of the inorganic alignment film 221, the shape of the concave portions 222b has a shape similar to the shape of the grooves 221b.

The concave portions 222b are formed so as to have a dimension in the depth direction of about, for example, 15 nm to 150 nm. In addition, the concave portions 222b are formed so as to have a dimension in the inclination direction of the columns 221a (dimension in the width direction of the concave portions 222b) of about, for example, 15 nm to 100 nm.

The grooves 221b are formed, for example, so as to be inclined corresponding to the inclination of the columns 221a with respect to the normal line direction of the surface of the substrate as shown in FIG. 4. Meanwhile, the concave portions 222b formed in the positions overlapping the grooves 221b have faces 222c which are inclined corresponding to the inclination of the columns 221a.

Note that, since plan configurations of the inorganic alignment film 221 and the protection film 222 are the same as those of the inorganic alignment film 161 and the protection film 162 described above, illustration and description thereof will be omitted.

When the liquid crystal device 100 configured as described above is manufactured, first, necessary patterns including wirings and electrodes are formed on the element substrate 10 and the counter substrate 20. Then, by physically vapor-depositing silicon oxide or metal oxide on the element substrate 10 and the counter substrate 20, each of the inorganic alignment film 161 and the inorganic alignment film 221 are formed (inorganic alignment film formation process). As the method for performing the physical vapor deposition, the inorganic alignment film 161 and the inorganic alignment film 221 constituting alignment films are formed by obliquely vapor-depositing $SiO_2$ using a vacuum vapor deposition method in the present embodiment.

With regard to oblique vapor deposition, the columns 161a and the columns 221a of $SiO_2$ are caused to grow in a direction oblique at a desired angle in the same azimuth as the vapor deposition by performing vapor deposition in a direction oblique by, for example, a predetermined angle from the substrate surfaces, and accordingly anisotropy is imparted to each of the inorganic alignment film 161 and the inorganic alignment film 221. The inorganic alignment film 161 and the inorganic alignment film 221 have alignment control power so as to be along the orientations of long axes of the columns 161a and the columns 221a on the top faces of the substrates when the long axes is projected on the substrates.

The vapor deposition orientation Va1 of the inorganic alignment film 161 and the vapor deposition orientation Va2 of the inorganic alignment film 221 are parallel to each other, but face opposite directions. Thus, the inorganic alignment film 161 and the inorganic alignment film 221 have alignment control directions which are parallel but face conversely.

When the oblique vapor deposition is performed, as viewed in the direction of the vapor deposition, vapor deposition particles easily adhere onto, for example, the patterns such as the wirings formed on the element substrate 10 or the counter substrate 20, and vapor deposition particles seldom adhere to a region serving as a shadow of the patterns. In this manner, regions to which vapor deposition particles easily adhere and regions to which vapor deposition particles seldom adhere are formed due to the uneven shape of the base of the inorganic alignment film 161 and the inorganic alignment film 221. For this reason, the columns 161a and the columns 221a are not uniformly disposed over the entire surface of the substrates, but density distribution is formed. To be specific, regions in which the columns 161a and the columns 221a are densely formed and regions in which the columns are sparsely formed are provided in the direction of the vapor deposition. In the inorganic alignment film 161 and the inorganic alignment film 221, portions in which the columns 161a and the columns 221a are sparsely formed are formed as the grooves 161b and the grooves 221b. Since the shade of the patterns is formed in the direction orthogonal to the direction of the vapor deposition in the oblique vapor deposition, the grooves 161b and the grooves 221b are formed so as to extend in the direction substantially orthogonal to the direction of the vapor deposition in positions corresponding to the patterns.

The uneven shapes of the bases can be obtained due to the sizes of the particle diameters of crystals of, for example, ITO films which are electrodes of the bases of the inorganic alignment film 161 and the inorganic alignment film 221. When the ITO films are formed using a sputtering method, the size or the number of the unevenness of the surfaces can be increased by changing the amount or the pressure of flowing oxygen, a film thickness, or the like.

Next, a material composing the protection film 162 and the protection film 222 is applied onto the inorganic alignment film 161 and the inorganic alignment film 221 formed as described above using the liquid phase film forming method such as the spin coat method or the ink jet method, and drying and burning thereof are performed. Accordingly, the protection film 162 and the protection film 222 are formed on the inorganic alignment film 161 and the inorganic alignment film 221 (protection film formation process).

When the liquid phase film forming method is performed, the material is applied over the columns 161a and the columns 221a formed using the oblique vapor deposition and the grooves 161b and the grooves 221b. At this moment, the material of the protection film 162 and the protection film 222 is applied so as not to completely bury the grooves 161b and the grooves 221b. Accordingly, the concave portions 162b along the shape of the grooves 161b are formed in the protection film 162, and the concave portions 222b along the shape of the grooves 221b are formed in the protection film 222.

In addition, by applying the material of the protection film 162 and the protection film 222, unevenness of the tips of the columns 161a and the columns 221a are flattened. Accordingly, the areas of the interfaces between the liquid crystal layer 50 and the inorganic alignment film 161 and the inorganic alignment film 221 shrink, and the number of photoactive groups present in the interfaces is reduced. There are cases in which the inorganic alignment film 161 and the inorganic alignment film 221 deteriorate due to optical reaction of the photoactive groups present in the interfaces between the liquid crystal layer 50. By flattening the surfaces of the inorganic alignment film 161 and the inorganic alignment film 221 with the protection film 162 and the protection film 222, the areas of the interfaces between the liquid crystal layer 50 and the inorganic alignment film 161 and the inorganic alignment film 221 can be shrunk and the number of the photoactive groups in the interfaces can be reduced, and therefore, optical deterioration reaction is suppressed.

In this manner, by forming the concave portions 162b and the concave portions 222b so as to leave a part of the shapes of the grooves 161b and the grooves 221b formed in the course of the oblique vapor deposition, a configuration in which the inorganic alignment film 161 and the inorganic alignment film 221 have the alignment control power with respect to the liquid crystal layer 50 while suppressing deterioration of the surface of the films can be formed with efficiency.

After the protection film 162 and the protection film 222 are formed, a panel is assembled so that the element substrate 10 and the counter substrate 20 are disposed opposing each other and spaced apart with a predetermined interval, then liquid crystal is injected to the interval, the injection port is sealed, and thereby the liquid crystal device 100 is completed.

As described above, in the present embodiment since the inorganic alignment film 161 and the inorganic alignment film 221 are covered respectively by the protection film 162 and the protection film 222 formed using an inorganic insulating material, the number of photoactive groups present in the first alignment layer 16 and the second alignment layer 22 in the interface between the liquid crystal layer 50 can be drastically reduced. Accordingly, occurrence of optical reaction can be lowered, improvement in the light resistance property can be attained. In addition, since the concave portions 162b and the concave portions 222b are formed on the surface of the protection film 162 and the protection film 222 covering the inorganic alignment film 161 and the inorganic alignment film 221, the alignment control property of the liquid crystal layer 50 can be secured. Accordingly, the liquid crystal device 100 which is excellent in the light resistance property while having the alignment control property of the liquid crystal layer 50 is obtained.

Second Embodiment

Next, a second embodiment of the present invention will be described.

FIG. 7 is a schematic diagram showing an example of an optical system of a projector 500 according to an embodiment of the invention.

As illustrated in FIG. 7, the projector 500 is configured to have a light source device 501, an integrator 504, a polarization converter 505, a color separation light-guide optical system 502, a liquid crystal light modulation device 510R, a liquid crystal light modulation device 510G, and a liquid crystal light modulation device 510B as light modulation devices, cross-dichroic prism 512, and a projection optical system 514.

The liquid crystal light modulation devices 510R, 510G, and 510B is provided with liquid crystal devices 520R, 520G, and 520B as will be described later. As the liquid crystal devices 520R, 520G, and 520B, for example, liquid crystal device 100 described in each of embodiments above can be used.

The light source device 501 supplies light beams including red light (hereinafter, referred to as "R light") that is first color light, green light (hereinafter, referred to as "G light") that is second color light, and blue light (hereinafter, referred to as "B light") that is third color light. As the light source device 501, for example, an ultra-high pressure mercury lamp can be used.

The integrator 504 uniformizes illuminance distribution of light from the light source device 501. The light of which illuminance distribution is uniformized is converted into polarized light having a specific oscillation direction in the polarization converter 505, for example, s-polarized light which is s-polarized with respect to a reflection face of the color separation light-guide optical system 502. The light converted into the s-polarized light is incident on an R light transmissive dichroic mirror 506R constituting the color separation light-guide optical system 502.

The color separation light-guide optical system 502 is configured to have the R light transmissive dichroic mirror 506R, a B light transmissive dichroic mirror 506B, three reflection mirror 507, and two relay lenses 508.

The R light transmissive dichroic mirror 506R transmits R light, and reflects G light and B light. The R light that has been transmitted through the R light transmissive dichroic mirror 506R is incident on the reflection mirror 507.

The reflection mirror 507 turns the optical path of the R light 90 degrees. The R light of which the optical path is turned is incident on the liquid crystal light modulation device 510R for R light. The liquid crystal light modulation device 510R for R light is a transmittive-type liquid crystal device that modulates R light according to image signals.

The liquid crystal light modulation device 510R for R light has a λ/2 phase difference plate 523R, a glass plate 524R, a first polarization plate 521R, the liquid crystal device 520R, and a second polarization plate 522R. The λ/2 phase difference plate 523R and the first polarization plate 521R are disposed in a state in which the plates come into contact with the transparent glass plate 524R that does not convert a polarization direction. Note that, in FIG. 7, the second polarization plate 522R is provided separately, but may be disposed in a state in which the plate comes into contact with the emission face of the liquid crystal device 520R or the incidence face of the cross-dichroic prism 512.

The optical paths of the G light and the B light reflected from the R light transmissive dichroic mirror 506R are turned 90 degrees. The G light and the B light of which the optical paths are turned are incident on the B light transmissive dichroic mirror 506G. The B light transmissive dichroic mirror 506G reflects G light, and transmits B light. The G light reflected from the B light transmissive dichroic mirror 506G is incident on the liquid crystal light modulation device 510G for G light. The liquid crystal light modulation device 510G for G light is a transmissive-type liquid crystal device which modulates G light according to image signals. The liquid crystal light modulation device 510G for G light has the liquid crystal device 520G, a first polarization plate 521G, and a second polarization plate 522G.

The G light incident on the liquid crystal light modulation device 510G for G light is converted into s-polarized light. The s-polarized light incident on the liquid crystal light modulation device 510G for G light is transmitted through the first polarization plate 521G as is, and then incident on the liquid crystal device 520G. The s-polarized light incident on the liquid crystal device 520G is modulated according to the image signals, and the G light is converted into p-polarized light. The G light converted into the p-polarized light from the modulation of the liquid crystal device 520G is emitted from the second polarization plate 522G. In this manner, the G light modulated by the liquid crystal light modulation device 510G for G light is incident on the cross-dichroic prism 512.

The B light that has been transmitted through the B light transmissive dichroic mirror 506G is incident on the liquid crystal light modulation device 510B for B light via the two relay lenses 508 and the two reflection mirrors 507.

The liquid crystal light modulation device 510B for B light is a transmissive liquid crystal device which modulates B light according to the image signal. The liquid crystal light modulation device 510B for B light has a λ/2 phase difference plate 523B, a glass plate 524B, a first polarization plate 521B, the liquid crystal device 520B, and a second polarization plate 522B.

The B light incident on the liquid crystal light modulation device 510B for B light is converted into s-polarized light. The s-polarized light incident on the liquid crystal light modulation device 510B for B light is converted into p-polarized light by the λ/2 phase difference plate 523B. The B light converted into the p-polarized light is transmitted through the glass plate 524B and the first polarization plate 521B as is, and incident on the liquid crystal device 520B. The p-polarized light incident on the liquid crystal device 520B is modulated according to the image signals, and the B light is converted into s-polarized light. With the modulation of the liquid crystal device 520B, the B light converted into the s-polarized light is emitted from the second polarization plate 522B. The B light modulated in the liquid crystal light modulation device 510B for B light is incident on the cross-dichroic prism 512.

In this manner, the R light transmissive dichroic mirror 506R and the B light transmissive dichroic mirror 506G constituting the color separation light-guide optical system 502 separate the light supplied from the light source device 501 into the R light that is the first color light, the G light that is the second color light, and the B light that is the third color light.

The cross-dichroic prism 512 that is a color synthesizing optical system is configured by disposing two dichroic films 512a and 512b so as to be orthogonal to each other in an X shape. The dichroic film 512a reflects the B light and transmits the G light. The dichroic film 512b reflects the R light and transmits the G light. In this manner, the cross-dichroic prism 512 synthesizes the R light, the G light, and the B light each modulated by the liquid crystal light modulation device 510R for R light, the liquid crystal light modulation device 510G for G light, and the liquid crystal light modulation device 510B for B light.

The projection optical system 514 projects the light synthesized by the cross-dichroic prism 512 to a screen 516. Accordingly, a full-color image can be obtained on the screen 516.

As described above, according to the present embodiment, since the liquid crystal devices 520R, 520G, and 520B (the liquid crystal device 100) which have the alignment control property of the liquid crystal layer 50 while being excellent in the light resistance property are provided, the projector 500 that is highly reliable in the display characteristic and life can be obtained.

The technical scope of the present invention is not limited to the embodiments described above, and can be appropriately modified within the scope not departing from the gist of the present invention.

For example, the embodiments are described exemplifying that the protection film 162 and the protection film 222 are formed using the liquid phase film forming method, however, the method is not limited thereto, and the protection film 162 and the protection film 222 may be formed using other method (for example, the sputtering method, or the like).

In addition, the liquid crystal device 100 of the embodiments is not limited to a light valve of the liquid crystal projector, and can be used as a high-temperature polysilicon TFT liquid crystal (HTPS), a reflection-type high-temperature polysilicon TFT liquid crystal (R-HTPS), liquid crystal on silicon (LCOS), digital signage, and an electronic view finder (EVF).

In addition, the liquid crystal device 100 of the embodiments described above can be appropriately used as various image display means of mobile telephones, electronic maps, personal computers, digital still cameras, television receiver sets, view finder type or monitor straight view type video tape recorders, car navigation systems, pagers, electronic organizers, electronic calculators, word processors, work stations, video telephones, POS terminals, devices having touch panels, and the like, and with such configurations, electronic apparatus having display units with high display quality and excellent reliability can be provided.

EXAMPLES

Examples of the present invention will be described. In each example described below, the inorganic alignment film 161, the inorganic alignment film 221, the protection film 162, and the protection film 222 are formed for the element substrate 10 and the counter substrate 20 under the conditions described in each examples. Then, an alignment state and a light resistance property of liquid crystal devices having the inorganic alignment films and the protection films formed with each condition are tested.

With regard to the alignment state, an alignment state during conduction was observed using crossed Nicols.

A mercury lamp (manufactured by HOYA Corporation) was used as a light source in the test of the light resistance property. In addition, As a specific test method, light having a wavelength of 250 nm to 400 nm was generated using a band pass filter, and radiated on the liquid crystal device (panel). Light intensity at this moment was set to be 20 mW/cm$^2$, and temperature of the panel during the test was set to be 35° C.

Example 1

With regard to the inorganic alignment films, using the oblique vapor deposition, the angle from the normal line of the substrates was set to be 55°, pressure during the vapor deposition was set to be $3.0 \times 10^{-2}$ Pa, and thereby an $SiO_x$ film with a thickness of 150 nm (material was an $SiO_2$ tablet manufactured by USTRON Corporation) was formed.

For the protection films, using the spin coat method, thin films of a silicon compound (OA040 which is a polysiloxane-based vertical alignment material manufactured by Nissan Chemical Industries, Ltd.) were formed with a condition of having a thickness of 30 nm.

In a liquid crystal device having the inorganic alignment films and the protection films, the alignment state was uniform, and with regard to the light resistance property, no abnormal alignment was found even when the device was radiated with light for one hour.

Example 2

With regard to the inorganic alignment films, using the oblique vapor deposition, the angle from the normal line of the substrates was set to be 45°, pressure during the vapor deposition was set to be $3.0 \times 10^{-2}$ Pa, and thereby an $SiO_x$ film with a thickness of 150 nm (material was an $SiO_2$ tablet manufactured by USTRON Corporation) was formed. By setting the angle from the normal line of the substrates to be smaller than in Example 1, a dimension of grooves (the width of grooves) in the vapor deposition direction decreased.

For the protection films, using the spin coat method, thin films of a silicon compound (OA040 which is a polysiloxane-based vertical alignment material manufactured by Nissan Chemical Industries, Ltd.) were formed with a condition of having a thickness of 10 nm.

In a liquid crystal device having the inorganic alignment films and the protection films, the alignment state was uniform, and with regard to the light resistance property, no abnormal alignment was found even when the device was radiated with light for one hour.

Example 3

With regard to the inorganic alignment films, using the oblique vapor deposition, the angle from the normal line of the substrates was set to be 65°, pressure during the vapor deposition was set to be $3.0 \times 10^{-2}$ Pa, and thereby an $SiO_x$ film with a thickness of 150 nm (material was an $SiO_2$ tablet manufactured by USTRON Corporation) was formed. By setting the angle from the normal line of the substrates to be greater than in Example 1, a dimension of grooves (the width of grooves) in the vapor deposition direction increased.

For the protection films, using the spin coat method, thin films of a silicon compound (OA040 which is a polysiloxane-based vertical alignment material manufactured by Nissan Chemical Industries, Ltd.) were formed with a condition of having a thickness of 30 nm.

In a liquid crystal device having the inorganic alignment films and the protection films, the alignment state was uniform, and with regard to the light resistance property, no abnormal alignment was found even when the device was radiated with light for one hour.

Example 4

It was configured that a particle diameter of liquid crystal of base ITO used in electrodes of an element substrate and a counter substrate was set to be smaller than in other examples by changing, for example, a flow amount or pressure of oxygen, a film thickness, or the like, and unevenness of a surface was increased.

With regard to the inorganic alignment films, using the oblique vapor deposition, the angle from the normal line of the substrates was set to be 55°, pressure during the vapor deposition was set to be $3.0 \times 10^{-2}$ Pa, and thereby an $SiO_x$ film with a thickness of 150 nm (material was an $SiO_2$ tablet manufactured by USTRON Corporation) was formed. In this case, density of grooves was higher than in other examples.

For the protection films, using the spin coat method, thin films of a silicon compound (OA040 which is a polysiloxane-based vertical alignment material manufactured by Nissan Chemical Industries, Ltd.) were formed with a condition of having a thickness of 30 nm.

In a liquid crystal device having the inorganic alignment films and the protection films, the alignment state was uniform, and with regard to the light resistance property, no abnormal alignment was found even when the device was radiated with light for one hour.

Example 5

It was configured that a particle diameter of liquid crystal of base ITO used in electrodes of an element substrate and a counter substrate was set to be smaller than in other examples by changing, for example, a flow amount or pressure of oxygen, a film thickness, or the like, and unevenness of a surface was increased.

With regard to the inorganic alignment films, using the oblique vapor deposition, the angle from the normal line of the substrates was set to be 45°, pressure during the vapor deposition was set to be $8.5 \times 10^{-3}$ Pa, and thereby an $SiO_x$ film with a thickness of 75 nm (material was an $SiO_2$ tablet manufactured by USTRON Corporation) was formed. In this case, density of grooves was higher than in other examples.

For the protection films, using the spin coat method, thin films of a silicon compound (OA040 which is a polysiloxane-based vertical alignment material manufactured by Nissan Chemical Industries, Ltd.) were formed with a condition of having a thickness of 10 nm.

In a liquid crystal device having the inorganic alignment films and the protection films, the alignment state was uniform, and with regard to the light resistance property, no abnormal alignment was found even when the device was radiated with light for one hour.

Example 6

With regard to the inorganic alignment films, using the oblique vapor deposition, the angle from the normal line of the substrates was set to be 60°, pressure during the vapor deposition was set to be $3.0 \times 10^{-2}$ Pa, and thereby an $SiO_x$ film with a thickness of 80 nm (material was an $SiO_2$ tablet manufactured by USTRON Corporation) was formed.

For the protection films, using the sputtering method, thin films of $SiO_x$ were formed with a condition of having a thickness of 20 nm. Accordingly, protection films formed to be more elaborate than in other examples were obtained.

In a liquid crystal device having the inorganic alignment films and the protection films, the alignment state was uniform, and with regard to the light resistance property, no abnormal alignment was found even when the device was radiated with light for one hour.

Comparative Example

As an alignment layer, a polyimide thin film (AL-00010 which is a vertical alignment material manufactured by JSR Corporation) was formed with a condition of having a thickness of 40 nm using the spin coat method, and then was rubbed.

In a liquid crystal device having the alignment layer, the alignment state was uniform, but with regard to the light resistance property, abnormal alignment was found when the device was radiated with light for 5 minutes.

Reference Example

For an alignment layer, a thin film of a silicon compound (OA040 which is a polysiloxane-based vertical alignment material manufactured by Nissan Chemical Industries, Ltd.) was formed with a condition of having a thickness of 40 nm using the spin coat method.

In a liquid crystal device having the alignment layer, the alignment state was uniform, and with regard to the light resistance property, no abnormal alignment was found even when the device was radiated with light for one hour.

The entire disclosure of Japanese Patent Application No. 2012-205348, filed Sep. 19, 2012 is expressly incorporated by reference herein.

What is claimed is:

1. A liquid crystal device comprising:
a substrate;
a base body that is disposed opposing the substrate;
a liquid crystal layer that is held between the substrate and the base body;
an inorganic alignment film that is provided between the liquid crystal layer and the substrate or the base body; and
an inorganic protection film that is provided between the inorganic alignment film and the liquid crystal layer,
wherein the inorganic alignment film has a plurality of grooves that are hollowed toward the surface on the opposite side of the liquid crystal layer from the surface on the liquid crystal layer side,
wherein the inorganic protection film has a cave-in shape toward the opposite side to the liquid crystal layer from the liquid crystal layer side in at least one portion of portions corresponding to the plurality of grooves, and
wherein the inorganic protection film comprises any of a polysiloxane-based vertical alignment material, silicon oxide, silicon nitride, and aluminum oxide.

2. The liquid crystal device according to claim 1,
wherein the inorganic alignment film includes a plurality of columns that are inclined to the normal line direction of a surface of the substrate or the base body, and
wherein, in the inclination, when an inclination direction as viewed from the top in the normal line direction of the surface of the substrate or the base body is set to be a first direction, the plurality of grooves are formed in a second direction intersecting with the first direction.

3. The liquid crystal device according to claim 2, wherein the plurality of grooves are hollows which are inclined in the same direction as the inclination direction of the plurality of columns with respect to the normal line direction of the substrate or the base body.

4. The liquid crystal device according to claim 1, wherein the inorganic protection film gets into the plurality of grooves and thereby reduces the depths of the hollows.

5. The liquid crystal device according to claim 1, further comprising:
a step portion on the surface of the substrate or the base body on the liquid crystal layer side,
wherein the plurality of grooves are formed in a portion corresponding to the step portion.

6. The liquid crystal device according to claim 5,
wherein an electrode is further formed on the surface of the substrate or the base body on the liquid crystal layer side, and
wherein the step portion is formed on the surface of the electrode on the liquid crystal layer side.

7. The liquid crystal device according to claim 1, wherein the inorganic protection film is formed using a liquid phase film forming method.

8. The liquid crystal device according to claim 1, wherein the inorganic alignment film is formed using an oblique vapor deposition method.

9. A projector comprising the liquid crystal device according to claim 1.

* * * * *